US006486249B1

(12) United States Patent
Dituro et al.

(10) Patent No.: US 6,486,249 B1
(45) Date of Patent: Nov. 26, 2002

(54) ASPHALT RELEASE AGENT

(75) Inventors: Michael A. Dituro, Huntington, WV (US); Frances E. Lockwood, Georgetown, KY (US); Daniel J. Dotson, Lexington, KY (US); Jiafu Fang, Spring, TX (US)

(73) Assignee: Ashland Inc., Lexington, KY (US)

( * ) Notice: Subject to any disclaimer, the term of this patent is extended or adjusted under 35 U.S.C. 154(b) by 261 days.

(21) Appl. No.: 09/693,454

(22) Filed: Oct. 20, 2000

Related U.S. Application Data

(63) Continuation-in-part of application No. PCT/US99/08676, filed on Apr. 20, 1998.
(60) Provisional application No. 60/082,353, filed on Apr. 20, 1998.

(51) Int. Cl.⁷ .............................. C09D 5/08; C09D 5/20; C09D 191/00; C09K 3/00; C08K 5/06
(52) U.S. Cl. ...................... 524/388; 524/376; 524/377; 524/378
(58) Field of Search .............................. 106/2; 524/376, 524/377, 378

(56) References Cited

U.S. PATENT DOCUMENTS

| 4,011,311 A | 3/1977 | Noomen et al. |
| 4,068,023 A | 1/1978 | Nielsen et al. |
| 4,142,014 A | 2/1979 | Mestetsky |
| 4,312,901 A | 1/1982 | Kekish et al. |
| 4,421,791 A | 12/1983 | Kekish et al. |
| 4,425,381 A | 1/1984 | Walsh |
| 4,889,880 A | 12/1989 | Miller |
| 5,175,277 A | 12/1992 | Rakitsky |
| 5,186,979 A | 2/1993 | Ballenger, Jr. et al. |
| 5,322,554 A | 6/1994 | De Long |
| 5,494,502 A | 2/1996 | De Long |
| 5,580,376 A | 12/1996 | Hayner |
| 5,738,813 A | 4/1998 | Naganawa et al. |
| 5,888,279 A | 3/1999 | Salmousen et al. |
| 6,001,382 A | 12/1999 | Levy |

Primary Examiner—Nathan M. Nutter
(74) Attorney, Agent, or Firm—Carrithers Law Office; David W. Carrithers

(57) ABSTRACT

The present invention relates generally to the field of release agents commonly in uses in preventing asphalt and other sticky compounds such as rubbers from sticking to the transporting vehicles such as dump truck beds and processing tools, and equipment, and more particularly to a novel biodegradable release agent applied to metal surfaces prior to use for promoting free release of sticky hot-mix asphalt materials from the metal tools and equipment used in road construction applications.

32 Claims, No Drawings

ASPHALT RELEASE AGENT

This application is a Continuation-In-Part of patent application Ser. No. PCT/US99/08676 which claims priority from U.S. Provisional Patent Application Ser. No. 60/082,353 filed on Apr. 20, 1998 both of which are hereby incorporated by reference.

FIELD OF THE INVENTION

The invention relates to the field of release agents for use in preventing asphalt and other sticky compounds such as rubbers from sticking to the transporting vehicles such as dump truck beds and processing tools, and equipment, and more particularly to a novel release agent applied to metal surfaces prior to use for promoting free release of sticky hot-mix asphalt materials from the metal or plastic tools and equipment used in road construction applications.

DESCRIPTION OF THE PRIOR ART

Many roads are paved with asphalt produced on site or an asphalt plant in close proximity to an asphalt plant and is transported to the construction site in large trucks with metal beds, typically referred to as "dump trucks". There the asphalt is spread and applied to existing asphalt pavement or a rock or concrete base, with shovels, rakes, and other metal tools usually in addition to a large paving machine and or grader. Problems occur due to the asphalt tending to stick on contact to any surface preventing total emptying of the load from a dump truck bed and adding unneeded weight to tools used to form and compress the asphalt in the selected areas. Since the asphalt is usually heated and is transported and applied in the hot state, the differentiation in temperatures between the asphalt and metal surfaces serves to cause sticking problems. Thus, the main disadvantage is that the sticking of the asphalt to the surface of the truck bed prevents the asphalt from smoothly sliding out of the metal truck bed as the dump truck attempts to discharge its asphalt load onto the road surface or into a paving machine. Time is wasted coaxing the asphalt out of the truck bed and the workers are exposed to hot asphalt which may contain petroleum based chemicals creating undesirable exposure to workers. Coating of the asphalt on to drums, storage tanks, trailers, piping, tires, and rollers causes cleanup and maintenance problems.

Conventional asphalt release agents known in the art to prevent asphalt from sticking to metallic surfaces were often based on chemicals commonly available at the construction site. For instance, kerosene or diesel fuel was often used to provide a release agent; however, these fuel oil based chemicals are flammable and often act as a solvent to dilute or cut the asphalt impairing the structural integrity of the asphalt product applied to the road surface. There are also environmental concerns relating to the use of fuel oil based release agents due to application and absorption of the oil based release agents into the ground and the evaporation of same especially in light of the exposure to the workers. Moreover, these traditional oil based cutting agents are not always effective against modern asphalt compositions.

An important consideration of the present invention is its effectiveness as an asphalt release agent for various compositions of asphalt in view of new types of asphalt mixes such as rubber based asphalt, asphalt containing polymers as well as conventional asphalt.

In the case of paving asphalt, a typical paving asphalt mixture comprises a mixture of components. The principal ingredients of the paving asphalt mixture being an asphalt composition or cement and aggregate or aggregate material usually containing rock and/or gravel. In such mixtures, the ratio of asphalt composition to the aggregate material varies, for example, according to the aggregate material type and the nature of the asphalt composition. As used herein, the terms "asphalt composition" or "asphalt cement" are understood to refer to any of a variety of organic materials, solid or semi-solid at room temperature, which gradually liquefy when heated, and in which the predominant constituents are naturally occurring bitumens or residues commonly obtained in petroleum, synthetic petroleum, or shale oil refining, or from coal tar, or the like. For example vacuum tower bottoms produced during the refining of conventional or synthetic petroleum oils is a common residue material useful as asphalt composition. A "paving asphalt composition" or "paving asphalt cement", accordingly, is an asphalt composition or asphalt cement having characteristics which dispose the composition for use as a paving material, as contrasted, for example, with an asphalt composition suited for use as a roofing material. "Roofing asphalt", for example, usually have a higher softening point, and are thus more resistant to flow from heat on roofs. The higher softening point is generally imparted to the material by the air blowing processes used for producing the material. Although the present invention can be used with any type of asphalt composition or aggregate mix therewith, paving grade asphalt are typically utilized with the present invention. Paving asphalt mixtures may be formed and applied in a variety of ways. For example, the paving asphalt composition and the aggregate are typically mixed and applied at elevated temperatures at the fluid state of the paving asphalt composition to form the pavement or road surface. However, the asphalt composition may also be applied in alternating layers with the aggregate mix.

The paving grade asphalt compositions may be composed of any know bituminous or asphaltic substance obtained from natural sources and/or derived from petroleum, shale oil, coal tar, and the like, as well as mixtures of two or more of such materials. The paving asphalt compositions are often referred to as viscosity or penetration grade asphalt, having original penetrations up to 400 as measured by ASTM method D%. Preferred asphalt are the normal paving asphalt such as AC2.5, AC5, AC10, AC20, AC30, and AD40. The designation "AC" in the title define the "asphalt cement" and the number indicates the viscosity at 60° C. in poise multiplied by 100. Typical of such asphalt are the straight run asphalt derived from the atmospheric, steam and/or vacuum distillation of crude oils, or those asphalt derived from solvent precipitation treatments or raw lubricating oils and their fractions. Also included, are the thermal or "cracked" asphalt which are separated as cracker bottom residues from refinery cracking operations and the asphalt produced as by-products in hydro-refining operations. A preferred asphalt is the vacuum tower bottoms that are produced during the refining of synthetic or petroleum oils. The asphalt may be treated or modified before use in the invention.

Inventions taught by the prior art typically employ an approach to formulation by providing a release agent which contains components capable of attacking asphalt material and therefore soften the asphalt in immediate contact with coating of the release agent applied on the surface of the transporting vehicles such as the bed of a dump truck used for hauling the hot-mix asphalt in road constructions. Such components include petroleum base oils such as diesel and biodegradable vegetable oils and animal fats. Although vegetable oils and animal fats are less aggressive than diesel whose use as an asphalt release agent is prohibited by law, they can still strip asphalt from the hot-mix at an elevated temperature commonly observed in road constructions and hence weaken the strength of the construction material which must meet strict criteria set between governmental and/or technical organizations such as the Department of Transportation (DOT) of US Government and local states. The stripping of asphalt from the hot-mix aggregates by release agents based on petroleum products or vegetable oils and animal fats often possess an unpleasant odor, attracting insects such as flies and therefore presenting a health hazard to the surrounding area nearby.

SUMMARY OF THE INVENTION

The invention is a composition for a release agent for use in preventing asphalt and other sticky compounds such as rubbers from sticking to the transporting vehicles such as dump truck beds and processing tools, and equipment, and more particularly to a biodegradable release agent applied to metal surfaces prior to use for promoting free release of sticky hot-mix asphalt materials from the metal or plastic tools and equipment used in road construction applications.

The present invention provides a release agent which, when applied as a coating on the surface such as a dump truck is loaded with the hot-mix and other processing equipment such as tools, drastically reduce the adhesion of asphalt to the surface, allowing hot-mix to slide out from the truck bed easily and cleanly. The release agent of the invention will not attack asphalt, therefore preserve the integrity of the hot-mix. The absence of any stripping effect of the release agent of the present invention is exemplified by the lack of asphalt film left behind on the truck bed after the hot-mix is unloaded from the truck. In fact, after the use of the release agent of the present invention, the truck bed would become cleaner and shinier. In addition, the release agent of the present invention is environmentally friendly, odorless, biodegradable and highly efficient.

One preferred composition of the asphalt release agent of the present invention provides a concentrate containing from about 1 to about 10% by weight PVA; from about 5 to about 40% by weight glycerol; from about 1 to about 20% by weight polyethyleneglycol; and optionally, but preferably from about 0.001 to about 5.0% by weight of a wetting agent or surfactant, such as sodium dioctyl sulfosuccinate. An effective amount of a water soluble biocide may also be incoporated into the formula. The concentrate is diluted with water depending on the stickiness of the asphalt material. For example, a polymer modified asphalt liquid is typically stickier that a conventional grade containing no added polymeric materials and requires a stronger dosage of application of release agent typically in a ratio of 1 part concentrate to 4, 5, or 6 parts of water by volume. The conventional grade of asphalt may be diluted to 1 part concentrate to 19, 20, or 21 parts water by volume.

It is an object of the present invention to provide an asphalt release agent which is effective in preventing the sticking of asphalt to truck beds and other metal, plastic, paper, or wood surfaces.

It is an object of the present invention to provide an asphalt release agent which is innocuous and inexpensive.

It is an object of the present invention to provide an asphalt release agent which is environmentally safe.

It is an object of the present invention to provide an asphalt release agent which is soluble in water.

It is an object of the present invention to provide an asphalt release agent which does not dilute or affect the quality of the asphalt.

It is an object of the present invention to provide an asphalt release agent which can be applied with conventional spraying equipment.

It is an object of the present invention to provide an asphalt release agent which can be diluted with water before application depending upon the type and stickness of the asphalt.

It is an object of the present invention to provide a release agent which can be diluted with water and applied to concrete forms fabricated from wood or metal or onto the metal surface of the concrete container and conveying equipment.

The objects of the present invention will be more fully understood from the following description of the invention.

DESCRIPTION OF THE PREFERRED EMBODIMENT

The present invention relates to novel release agent compositions and methods of applying such compositions to the metal and other surfaces which come in contact with asphalt materials. Although the release agent of the present invention is specifically designed for uses in prevention hot-mix asphalt from sticking to the appropriate surfaces, it is also expected to have utility as a release agent for a wide variety of materials such as other heavy hydrocarbons, plastics, and rubbers. The composition may also be employed as a biodegradable, environmental friendly dust suppressant for use in industrial processes such as with coal or limestone crushing operations, or in construction operations for settling dust formed by operation of heavy equipment or settling dust formed by cutting concrete in construction operations.

According to the present invention, a preferred composition of an asphalt release agent comprises a polymeric film former, a co-film former, a film modifier, and preferably, a wetting agent. An anti-microbial agent or preservative and a corrosion inhibitor can also be used. It is not necessary that each of these ingredients needs to be present in the composition in order for the composition to function as a release agent; however, the combination promotes optimal performance of the release agent.

In the preferred embodiment of the present invention, the preferred polymeric film former is polyvinyl alcohol (PVA). PVA is a water-soluble synthetic polymer made by alcoholysis of polyvinyl acetate. It is commercially available as a powder. Water solubility increases as the molecular weight decreases. The strength, elongation, tear resistance, and flexibility improve with increasing molecular weight. PVA decomposes at about 200° C. It is unaffected by oils, greases, and petroleum hydrocarbons. It forms films by evaporation from a water solution.

PVA is commercially available as in grades defined by molecular weight-average ranging from 250,000 to 300,000. A molecular weight-average of from about 250,000 to about 300,000 is considered to be a super high viscosity product, a molecular weight-average of from about 170,000 to about 220,000 is considered to be a high viscosity product, a molecular weight-average of from about 120,000 to about 150,000 is considered to be a medium viscosity product, a molecular weight-average of from about 25,000 to about 35,000 is considered to be a low viscosity product.

The PVA constituents of the present invention have a molecular weight-average (MW) of between 100,000 and 300,000 and a degree of hydrolysis (DH) between 5% and 100%, more preferably a molecular weight-average of between 200,000 and 300,000 and a degree of hydrolysis between 20% and 99%; and most preferably a molecular weight-average between 250,000 and 300,000 and a degree of hydrolysis between 50% and 95%.

According to the present invention, a preferred co-film former is polyalkylglycol and derivatives thereof, such as polyethylene glycol, ("PEG"), glycol having molecular weight-average of preferably between 100 and 20,000; more preferably a molecular weight-average between 120 and 10,000; more preferably a molecular weight-average between 150 and 6,000, and most preferably a molecular weight-average of between 400 and 2,000.

In the instant composition, use of a polyethylene glycol as a co-film former tends to deaeriate the asphalt release agent solution, enhancing the coating or sheeting ability of the product and lowering the viscosity and preventing the formation of bubbles of the applied composition. Application to the surface to be treated at pressures of up to 300 psig (pounds per sq. inch gauge) tends to create bubbles and a foaming action which is not necessary and considered undesirable with the present composition.

Other condensation polymers or ethylene glycol compounds selected from the group consisting essentially of ethylene glycol, diethylene glycol, propylene glycol, triethylene glycol, dipropylene glycol, tripropylene glycol, 1-3 butylene glycol, hexylene glycol, and combinations thereof from about 80 to about 90 percent by weight.

In the preferred embodiment of the present invention, the film modifier or plasticizer is a poly-alcohol such as glycerol, ("glycerin") or glycyl alcohol ("1,2,3-propanetriol"). The glycerol provides a water soluble plasticizing agent which adsorbs into and is compatible with the PVA. The glycerol aids in the solubilization of the PVA in water solutions which is important in that the asphalt release agent is prepared in as a concentrate. Moreover, the glycerol is also an antifreeze lowering the freezing point of the asphalt release agent. Although it is recommended that asphalt not be applied to the road surface when the outside temperature is less than about 45° F., (7.2° C.), the asphalt release agent may be stored or be exposed to lower temperatures without damage in part due to the glycerol within the formula. Thus, the glycerol aids in the film forming properties of the composition as well as the storage stability of same. Moreover, the ability to form a hydrophobic release coating at low temperatures provides a useful release agent for coating coal hailing rail cars and other aggregate containing hoppers which contain particles of material and may be exposed to freezing temperatures whereby moisture migrating to the metal surfaces of the containers tend to cause the aggregates to stick.

Although the preferred plasticizer is glycerol, other suitable plasticizers include polymerized glycerol, glycol ethers such as tetraethylene glycol, diethylene glycol, triethylene glycol, polyethylene glycol, other ether polyols, 1,3-butanediol, and combinations thereof.

In the preferred embodiment of the present invention, the wetting agent is an anionic, non-ionic, or cationic surfactant or any combination thereof. The wetting agents including surfactants are utilized in the preferred embodiments in ranges from about 0.001 to about 5% by weight, from about 0.01 to about by weight, and most preferably from about 0.05 to 0.5% by weight. An example of a preferred wetting agent is an anionic surfactant, sodium dioctyl sulfosuccinate.

The wetting agent lowers the surface tension of the asphalt release agent tending to enhance the spreading of the composition providing a more uniform coating over the container surface. The asphalt release agent of the present invention will spread without the use of a wetting agent; however, surfaces which have been exposed to asphalt prior to the application of the present invention tend to be hydrophobic as is the asphalt, and the addition of the wetting agent improves the dispersion of the coating.

It should be noted that although the wetting agent is a surfactant, the purpose of the wetting agent is not to promote foaming, for bubbles created in foam tend to burst creating thin spots, voids and uneven dispersion of the asphalt release agent. In the instant invention, a small amount of foam may be formed upon initial application due to the pressured spray application due to the use of a surfactant; however, any foam produced is quickly dissipated and sheeting of the composition is promoted upon the treated surface. Any foaming is primarily the result of mixing of the surfactants with gas, and therefor can be reduced, controlled, and/or eliminated by limiting the air or gas formed in the application process and equipment.

Other surfactants which may be utilized in the present invention include silicone glycols, alkylbenzene sulfonates, alcohol ethoxylates, phosphate esters, betaines, alkylphenol ether sulfates, alkylaryl sulfonates.

It may be desirable to include an effective amount of a biocide in the formulation if the solution is stored for a long period of time. Any conventional biocide compatible with the polymer blend can be used that is nontoxic to humans and does not effect the water-solubility of the composition. For example, the concentrate may contain a preservative such as sodium benzoate in an effective amount of from about 0.001 to 5.0% by weight.

The following examples provide preferred concentration ranges of the present invention and various formulas. All of the formulas contain PVA and PEG; however, the optimal formulations include a polyalcohol such as glycerol or glycerin, and a wetting agent.

EXAMPLES

The following examples illustrate the formulations of the present invention:

| Component | preferable | More Preferable | Most Preferable |
|---|---|---|---|
| Example 1 | | | |
| Water | 10~99% | 20~99.87 | 50~99.55 |
| Polyvinylalcohol | 0.05~3o% | 0.1~20% | 0.15~15% |
| polyethyleneglycol | 0.05~80% | 0.1~70% | 0.2~50% |
| Example 2 | | | |
| Water | 10~99% | 20~99.8% | 50~99.5% |
| Polyvinylalcohol | 0.05~30% | 0.1~20% | 0.15~15% |
| polyethyleneglycol | 0.05~80% | 0.1~70% | 0.2~50% |
| glycerin | 0.1~80% | 0.2~70% | 0.4~50% |
| Example 3 | | | |
| Water | 10~99% | 20~99.8% | 50~99.5% |
| Polyvinylalcohol | 0.05~30% | 0.1~20% | 0.15~15% |
| polyethyleneglycol | 0.05~80% | 0.1~70% | 0.2~50% |
| wetting agent | 10 ppm~2% | 20 ppm~1% | 50 ppm~0.5% |
| Example 4 | | | |
| Water | 10~99% | 20~99.8% | 50~99.5% |
| Polyvinylalcohol | 0.05~30% | 0.1~20% | 0.15~15% |
| polyethyleneglycol | 0.05~80% | 0.1~70% | 0.2~50% |
| wetting agent | 10 ppm~2% | 20 ppm~1% | 50 ppm~0.5% |

More particularly, preferred concentrates of the present invention contain an effective amount of PVA, from about 0.1 to about 10% by weight PVA, more preferably from about 3 to 6% by weight PVA, and most preferably about 4%. by weight PVA; an effective amount of glycerin, from about 0.1 to about 40% by weight glycering, more preferably from about 5 to about 40% by weight glycerin, more preferably from about 15 to 25% by weight glycerin, and most preferably about 20% by weight glycerin; and effective amount of polyethyleneglycol, from about 0.1 to about 20% by weight polyethyleneglycol, more preferably from about 5 to 15% by weight polyethyleneglycol, and most preferably about 10% by weight polyethylene-glycol; and optionally from about 0.001 to about 5% by weight of a wetting agent such as sodium dioctyl sulfosuccinate, more preferably from about 0.01 to about 1% by weight of a wetting agent, and most preferably from about 0.05 to 0.5% by weight of a wetting agent.

APPLICATION

According to the present invention, the release agent is preferably applied onto the surface which is to come in contact with asphalt material by a pump-spray system, by a brush, by dipping, or by any other common coating application methods. For the economical reason, a release agent is usually prepared as a concentrate and shipped to the site of use.

The asphalt release agent of the present invention is mixed together forming a concentrate. It is diluted with water on-site before being applied to the appropriate surfaces. According to the present invention, the concentrate of the release agent is diluted with water preferably by 1 to 30 times by volume, more preferably by 1 to 20 times by volume, and most preferably 1 to 10 times by volume, depending on the stickiness of the asphalt material. For example, a polymer modified asphalt liquid is typically stickier that a conventional grade containing no added polymeric materials and requires a stronger dosage of application of release agent typically in a ratio of 1 part concentrate to 4, 5, or 6 parts of water by volume. The conventional grade of asphalt may be diluted to 1 part concentrate to 19, 20, or 21 parts water by water.

Usually asphalt is prepared at temperatures above 212° F., (100° C.), and more typically from about 300° F. (149° C.) to about 375° F., (191° C.). Application to the metal surface of the container or truck treated with the present invention results in flashing of the water vapor and formation of the thin film. Upon dumping the load of asphalt it has been found that the surface of the dump truck bed is substantially cleaner and smoother than before application of the release agent, even on bed surfaces having residual clumps of asphalt stuck thereto from prior loads. Treatment of the bed surface with the present release agent tends to promote scaring of the old dried asphalt from the bed upon dumping, leaving a cleaner surface than before application of the release agent. Although a residual amount of the release agent may be left upon the bed surface after dumping, additional treatment is required for more than two or three loads and preferably before each load of asphalt.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplifications presented hereinabove. Rather, what is intended to be covered is within the spirit and scope of the appended claims.

We claim:
1. An asphalt release agent concentrate, comprising:
   a polyvinyl alcohol in an amount of from about 1.0 to about 10% by weight;
   a plasticizer in an amount of from about 5 to about 40% by weight;
   a polyalkylglycol and derivatives thereof in an amount of from about 1 to 20% by weight; and
   a wetting agent in an amount of from about 0.001 to about 5.0% by weight.
2. The asphalt release agent concentrate of claim 1, including an effective amount of a water soluble biocide.
3. The asphalt release agent concentrate of claim 1, wherein 1 part of said concentrate is diluted with water in a range of from 4 to 6 parts of water by volume.
4. The asphalt release agent concentrate of claim 1, wherein 1 part of said concentrate is diluted with water in a range of from 19 to 21 parts of water by volume.
5. The asphalt release agent concentrate of claim 1, wherein 1 part of said concentrate is diluted with water in a range of from 4 to 21 parts of water by volume.
6. The asphalt release agent concentrate of claim 1, wherein said concentrate is soluble in water.
7. The asphalt release agent concentrate of claim 1, said concentrate upon dilution providing a means for suppressing dust.
8. The asphalt release agent concentrate of claim 1, said concentrate is biodegradable.
9. The asphalt release agent concentrate of claim 1, said concentrate is biodegradable.
10. The asphalt release agent concentrate of claim 1, including a corrosion inhibitor.
11. The asphalt release agent concentrate of claim 1, wherein said polyvinyl alcohol is selected from the group consisting of a weight average molecular weights ranging from 25,000 to 300,000.
12. The asphalt release agent concentrate of claim 1, wherein said polyvinyl alcohol is selected from the group consisting of a weight average molecular weights ranging from 35,000 to 250,000.
13. The asphalt release agent concentrate of claim 1, wherein said polyvinyl alcohol is selected from the group consisting of a molecular weights ranging from 120,000 to 220,000.
14. The asphalt release agent concentrate of claim 1, wherein said polyvinyl alcohol is selected from the group consisting of a weight average molecular weights ranging from 150,000 to 170,000.
15. The asphalt release agent concentrate of claim 1, wherein said polyvinyl alcohol is selected from the group consisting of a weight average molecular weight molecular weights ranging from between 100,000 and 300,000 and having a degree of hydrolysis (DH) between 5% and 100%.
16. The asphalt release agent concentrate of claim 1, wherein said polyvinyl alcohol is selected from the group consisting of a weight average molecular weight molecular weights ranging from between 200,000 and 300,000 and having a degree of hydrolysis between 20% and 99%.
17. The asphalt release agent concentrate of claim 1, wherein said polyvinyl alcohol is selected from the group consisting of a weight average molecular weight molecular Weights ranging from between 250,000 and 300,000 and having a degree of hydrolysis between 50% and 95%.
18. The asphalt release agent concentrate of claim 1, wherein said polyalkylglycol is a polyethylene glycol.
19. The asphalt release agent concentrate of claim 1, wherein said polyalkylglycol is a polyethylene glycol.

20. The asphalt release agent concentrate of claim 1, wherein said polyalkylglycol is selected from the group consisting of a weight average molecular weight between 100 and 20,000.

21. The asphalt release agent concentrate of claim 1, wherein said polyalkylglycol is selected from the group consisting of a weight average molecular weight between 120 and 10,000.

22. The asphalt release agent concentrate of claim 1, wherein said polyalkylglycol is selected from the group consisting of a weight average molecular weight between 150 and 6,000.

23. The asphalt release agent concentrate of claim 1, wherein said polyalkylglycol is selected from the group consisting of a weight average molecular weight between 400 and 2,000.

24. The asphalt release agent concentrate of claim 1, wherein said polyalkylglycol is selected from the group consisting of ethylene glycol, diethylene glycol, propylene glycol, triethylene glycol, dipropylene glycol, tripropylene glycol, 1-3 butylene glycol, hexylene glycol, and combinations thereof from about 80 to about 90 percent by weight.

25. The asphalt release agent concentrate of claim 1, wherein said plasticizer is glycerol.

26. The asphalt release agent concentrate of claim 1, wherein said plasticizer is selected from the group consisting of glycerol, polymerized glycerol, glycol ether, tetraethylene glycol, diethylene glycol, triethylene glycol, polyethylene glycol, ether polyols, 1,3-butanediol, and combinations thereof.

27. The asphalt release agent concentrate of claim 1, wherein said wetting agent is selected from the group consisting of an anionic, non-ionic, cationic surfactant, and combinations thereof.

28. The asphalt release agent concentrate of claim 1, wherein said wetting agent comprises from 0.01 to about 1.0 percent by weight.

29. The asphalt release agent concentrate of claim 1, wherein said wetting agent comprises from 0.05 to about 0.5 percent by weight.

30. The asphalt release agent concentrate of claim 1, wherein said wetting agent is sodium dioctyl sulfosuccinate.

31. The asphalt release agent concentrate of claim 1, wherein said wetting agent is selected from the group consisting of silicone glycols, alkylbenzene sulfonates, alcohol ethoxylates, phosphate esters, betaines, alkylphenol ether sulfates, and alkylaryl sulfonates.

32. The asphalt release agent concentrate of claim 2, wherein said biocide is sodium benzoate in an effective amount of from about 0.001 to 5.0 percent by weight.

* * * * *